US008200728B2

(12) United States Patent
Michaels et al.

(10) Patent No.: US 8,200,728 B2
(45) Date of Patent: Jun. 12, 2012

(54) SINE/COSINE GENERATOR

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 1049 days.

(21) Appl. No.: 12/129,654

(22) Filed: May 29, 2008

(65) Prior Publication Data
US 2009/0300088 A1    Dec. 3, 2009

(51) Int. Cl.
G06F 1/02 (2006.01)
(52) U.S. Cl. ....................................... 708/276
(58) Field of Classification Search .................. 708/276
See application file for complete search history.

(56) References Cited

U.S. PATENT DOCUMENTS

| 3,564,223 | A | | 2/1971 | Harris et al. | |
|---|---|---|---|---|---|
| 4,486,846 | A | * | 12/1984 | McCallister et al. | 708/276 |
| 4,646,326 | A | | 2/1987 | Backof, Jr. et al. | |
| 4,703,507 | A | | 10/1987 | Holden | |
| 4,855,946 | A | * | 8/1989 | Ruben et al. | 708/276 |
| 5,077,793 | A | | 12/1991 | Falk et al. | |
| 5,113,361 | A | * | 5/1992 | Damerow et al. | 708/276 |
| 5,276,633 | A | | 1/1994 | Fox et al. | |
| 5,319,735 | A | | 6/1994 | Preuss et al. | |
| 5,467,294 | A | * | 11/1995 | Hu et al. | 708/276 |
| 5,924,980 | A | | 7/1999 | Coetzee | |
| 5,937,000 | A | | 8/1999 | Lee et al. | |
| RE36,388 | E | * | 11/1999 | Fox et al. | 708/276 |
| 6,023,612 | A | | 2/2000 | Harris et al. | |
| 6,331,974 | B1 | | 12/2001 | Yang et al. | |
| 6,570,909 | B1 | | 5/2003 | Kansakoski et al. | |
| 6,614,914 | B1 | | 9/2003 | Rhoads et al. | |
| 6,842,479 | B2 | | 1/2005 | Bottomley | |
| 6,986,054 | B2 | | 1/2006 | Kaminaga et al. | |
| 7,023,323 | B1 | | 4/2006 | Nysen | |

(Continued)

FOREIGN PATENT DOCUMENTS

EP    0 849 664 A2    6/1998

(Continued)

OTHER PUBLICATIONS

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

(Continued)

*Primary Examiner* — Tan V. Mai
(74) *Attorney, Agent, or Firm* — Fox Rothschild, LLP; Robert J. Sacco (57) ABSTRACT

A method (300) for generating a sine and cosine of an input angle ($Ø_{102}$). The method involves decomposing $Ø_{102}$ to an octant or quadrant, a coarse angle (A), and a fine angle (B), determining cos(A), and determining sin(A). The method also involves decomposing cos(A) and sin(A) to a most significant word (MSW) and a least significant word (LSW). The method further involves computing an approximation of 1−cos(B), an approximation of sin(B), and a plurality of products ($P_1, \ldots, P_4$) using the MSWs and approximations. The method involves computing approximations of cos($Ø'_{102}$) and sin($Ø'_{102}$) using the values for cos(A), sin(A), and $P_1, \ldots, P_4$. The method involves scaling the approximations of cos($Ø'_{102}$) and sin($Ø'_{102}$) to a desired resolution.

25 Claims, 6 Drawing Sheets

U.S. PATENT DOCUMENTS

| | | | |
|---|---|---|---|
| 7,069,492 | B2 | 6/2006 | Piret |
| 7,076,065 | B2 | 7/2006 | Sherman et al. |
| 7,078,981 | B2 | 7/2006 | Farag |
| 7,079,651 | B2 | 7/2006 | Den Boer |
| 7,095,778 | B2 | 8/2006 | Okubo et al. |
| 7,233,969 | B2 | 6/2007 | Rawlins et al. |
| 7,269,198 | B1 | 9/2007 | Elliott et al. |
| 2002/0099746 | A1 | 7/2002 | Tie et al. |
| 2005/0050121 | A1 | 3/2005 | Klein et al. |
| 2005/0207574 | A1 | 9/2005 | Pitz et al. |
| 2006/0251250 | A1 | 11/2006 | Ruggiero et al. |
| 2008/0198832 | A1 | 8/2008 | Chester |
| 2008/0263119 | A1 | 10/2008 | Chester et al. |
| 2008/0294710 | A1 | 11/2008 | Michaels |
| 2008/0294956 | A1 | 11/2008 | Chester et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0110197 | A1 | 4/2009 | Michaels |
| 2009/0196420 | A1 | 8/2009 | Chester et al. |
| 2009/0202067 | A1 | 8/2009 | Michaels et al. |
| 2009/0245327 | A1 | 10/2009 | Michaels |
| 2009/0279688 | A1 | 11/2009 | Michaels et al. |
| 2009/0279690 | A1 | 11/2009 | Michaels et al. |
| 2009/0296860 | A1 | 12/2009 | Chester et al. |
| 2009/0310650 | A1 | 12/2009 | Chester et al. |
| 2009/0327387 | A1 | 12/2009 | Michaels et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO-2008099367 A2 | 8/2008 |
| WO | WO-2008130973 A1 | 10/2008 |

OTHER PUBLICATIONS

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5: p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan, Retrieved from the Internet: URL:http://www3.interscience.wiley.com/cgi-bin/fulltext/117910986/PDFSTART>: [retrieved on Aug. 4, 2009] p. 47-p. 48: p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP00467986; ISSN: 0165-1684.

Barile, Margherita, "Bijective," From MathWorld-A Wolfram Web Resource, created by Eric W. Weisstein. http://mathworld.wolfram.com/Bijective.html, (last modified May 25, 2012).

Weisstein, Eric W., "Injection," From MathWorld-A Wolfram Web Resource. http://mathworld.wolfram.com/Injection.html, (last updated May 29, 2007).

Weisstein, Eric W. "Surjection," From MathWorld-A Wolfram Web Resource, http://mathworld.wolfram.com/Surjection.html (last modified Apr. 30, 2002).

Yen, et al., (1999) "Residual Number System Assisted CDMA: A New System Concept", In: ACTS'99, Jun. 8-11 1999, Sorrento, Italy.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Morsche et al., "Signals and Systems," lecture notes, University of Eindhoven, The Netherlands (1999).

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Michaels, et al., U.S. Appl. No. 12/117,086, filed May 8, 2008, Entitled "Cryptographic System Including a Mixed Radix Number Generator With Chosen Statistical Artifacts".

Chester, et al., U.S. Appl. No. 12/116,104, filed May 6, 2008, Entitled, "A Closed Galois Field Cryptographic System".

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Micheals, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Micheals, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "AD-HOC Network Acquisition Using Chaotic Sequence Spread Waveform".

Michaels, Alan, U.S. Appl. No. 12/201,021, filed Aug. 29, 2008, entitled, "Multi-Tier AD-HOC Network Communications".

* cited by examiner

SINE/COSINE GENERATOR

BACKGROUND OF THE INVENTION

1. Statement of the Technical Field

The invention concerns communications systems, and more particularly, the efficient digital generation of sine/cosine evaluations.

2. Description of the Related Art

Conventional sine/cosine generators typically compute a sine and cosine of an input angle. According to one communications system application, the sine and cosine of the same input angle can be used together to form a quadrature form of a sinusoid, which is the equivalent to the complex-valued exponential evaluated at the input angle. Quadrature forms of sinusoids are well known to those having ordinary skill in the art, and therefore will not be described herein. However, it should be understood that quadrature sinusoids are often used in digital up conversion applications, digital down conversion applications, numerically controlled oscillator applications, and Fourier transform applications.

One conventional method for generating a quadrature sinusoid employs look up tables (LUT). The LUT based method is well known to those having ordinary skill in the art, and therefore will not be described herein. However, it should be understood that the LUT based method generally involves mapping a fixed-precision input angle to a pre-defined evaluation of a trigonometric function within some resulting accuracy. The LUT based method generally provides reasonably efficient computation for ten to twelve (10-12) bit precision sine and cosine trigonometric computations. If precisions greater than ten to twelve (10-12) bits is desired, then the LUT based method requires exponentially increasing amounts of hardware for linear increases in bits of precision. Therefore, the LUT based method is hardware inefficient for high-accuracy applications.

Other conventional methods for generating a quadrature sinusoid employ Coordinate Rotation Digital Computer (CORDIC) algorithms. CORDIC algorithms generally use vector rotation to compute the sine and cosine of an input angle. CORDIC algorithms involve iteratively performing vector rotations by an arbitrary angle using shift and add techniques. As such, CORDIC based methods are computationally intensive. Further, the basic CORDIC method cannot take advantage of any natural symmetries in the underlying trigonometric operators. As such, the basic CORDIC method is less efficient than tailored hardware calculators.

Another conventional method of generating a quadrature sinusoid employs an out-of-phase algorithm. This out-of-phase based method is described in U.S. Pat. No. 5,276,633. This out-of-phase based method more efficiently computes the sine and cosine of an input angle as compared to the LUT and CORDIC based methods. In this regard, it should be understood that the out-of-phase based method provides ten to eighteen (10-18) bit precision sine and cosine trigonometric computations. However, such a ten to eighteen (10-18) bit precision is unsuitable for digital signal processing applications requiring a higher degree of accuracy.

In view of the forgoing, there is a need for an improved sine/cosine generator and method for efficient digital generation of a sine/cosine of an input angle. The improved method needs to be less computationally intensive than the conventional CORDIC based methods. The improved method also needs to provide a bit precision greater than the bit precisions of conventional LUT and out-of-phase based methods.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns a method for efficient digital generation a sine and cosine of an input angle. The method involves decomposing the input angle into an octant or quadrant, a coarse angle, and a fine angle. The coarse angle can be in a quadrant, an octant, or a finer-resolution decomposition of a notional two dimensional (2D) complex-valued space. The fine angle can be bounded by a smallest coarse angle existing in the 2D space. The method also involves determining a cosine and a sine of the coarse angle. The cosine of the coarse angle is decomposed to a first most significant word and a first least significant word. Similarly, the sine of the coarse angle is decomposed to a second most significant word and a second least significant word. The method also involves computing an approximation of one minus a cosine of the fine angle and an approximation of a sine of the fine angle. The method further involves computing a plurality of products, generating an approximation of a cosine of the input angle modulo $\pi/k$, and generating an approximation of a sine of the input angle modulo $\pi/k$ using the cosine of the coarse angle, the sine of the coarse angle, and each of the products. k is an integer value selected in accordance with a particular type of partitioning and reconstruction process employed. For example, if an octant partitioning and reconstruction process is employed, then k is selected to be an integer equal to four (4). If a quadrant partitioning and reconstruction process is employed, then k is selected to be an integer equal to two (2).

According to an aspect of the invention, a first product is computed by multiplying the first most significant word by the approximation of a sine of the fine angle. A second product is computed by multiplying the first most significant word by the approximation of one minus a cosine of the fine angle. A third product is computed by multiplying the second most significant word by the approximation of one minus a cosine of the fine angle. A fourth product is computed by multiplying the second most significant word by the approximation of a sine of the fine angle.

According to another aspect of the invention, the approximation of the cosine of the input angle modulo $\pi/k$ is generated by computing a first difference and subtracting the fourth product from the first difference. The first difference is computed by subtracting the second product from the cosine of the coarse angle. The approximation of the sine of the input angle modulo $\pi/k$ is generated by computing a second difference and combining the first product with the second difference. The second difference is computed by subtracting the third product from the sine of the coarse angle.

According to another aspect of the invention, the method involves scaling the approximation of the sine of the input angle modulo $\pi/k$ by a first scale factor. The scaled approximation of the sine of the input angle modulo $\pi/k$ is combined with the approximation of the cosine of the input angle modulo $\pi/k$ to yield the cosine of the input angle modulo $\pi/k$. The method also involves scaling the approximation of the cosine of the input angle modulo $\pi/k$ by a second scale factor. The scaled approximation of the cosine of the input angle modulo $\pi/k$ is combined with the approximation of the sine of the input angle modulo $\pi/k$ to yield the sine of the input angle modulo $\pi/k$. The cosine of the input angle modulo $\pi/k$ is mapped to a cosine of the input angle using N most significant bits from the input angle. Similarly, the sine of the input angle $\pi/k$ is mapped to a sine of the input angle using the N most significant bits from the input angle. N is an integer value selected in accordance with a particular type of partitioning and reconstruction process employed. For example, if an octant partitioning and reconstruction process is employed, then N is selected to be an integer equal to three (3). If a quadrant partitioning and reconstruction process is employed, then N is selected to be an integer equal to two (2).

A sine/cosine generator is also provided. The sine/cosine generator is comprised of a decomposition device, at least one coarse angle device, at least one fine angle device, a product computation device, and an output computation device. The decomposition device is configured for decomposing the input angle into an octant or quadrant, a coarse angle, and a fine angle. Those with ordinary skill in the art will recognize that this decomposition technique and resulting processing may be extended to a coarse angle, a fine angle, and a hyperfine angle using similar trigonometry identities. The coarse angle device is configured for determining a cosine of the coarse angle, determining a sine of the coarse angle, decomposing the cosine of the coarse angle to a first most significant word and a first least significant word, and decomposing the sine of the coarse angle to a second most significant word and a second least significant word. The fine angle device is configured for computing an approximation of one minus a cosine of the fine angle and an approximation of a sine of the fine angle. The product computation device is configured for computing a plurality of products.

The output computation device is coupled to the product computation device and the coarse angle device. The output computation device is configured for generating approximations of a cosine of the input angle modulo $\pi/k$ and a sine of the input angle modulo $\pi/k$ using the cosine of the coarse angle, the sine of the coarse angle, and each of the products. The output computation device is also configured for computing the cosine and sine of the input angle modulo $\pi/k$ using scale factors, the approximation of the cosine of the input angle modulo $\pi/k$, and the approximation of the sine of the input angle modulo $\pi/k$. The output computation device is further configured for mapping the cosine and sine of the input angle modulo $\pi/k$ to a cosine and sine of the input angle using the N most significant bits of the input angle.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The present invention concerns efficient, fully pipelined non-linear processor (NLP) based sine/cosine generators. The NLP based sine/cosine generator provides an improved output bit precision as compared to conventional sine/cosine generators. For example, the NLP based sine/cosine generator provides greater than eighteen (18) bits of output precision. In contrast, conventional sine/cosine generators often provide ten to eighteen (10-18) bits of output precision.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment, or a hardware/software embodiment.

Figure 1:
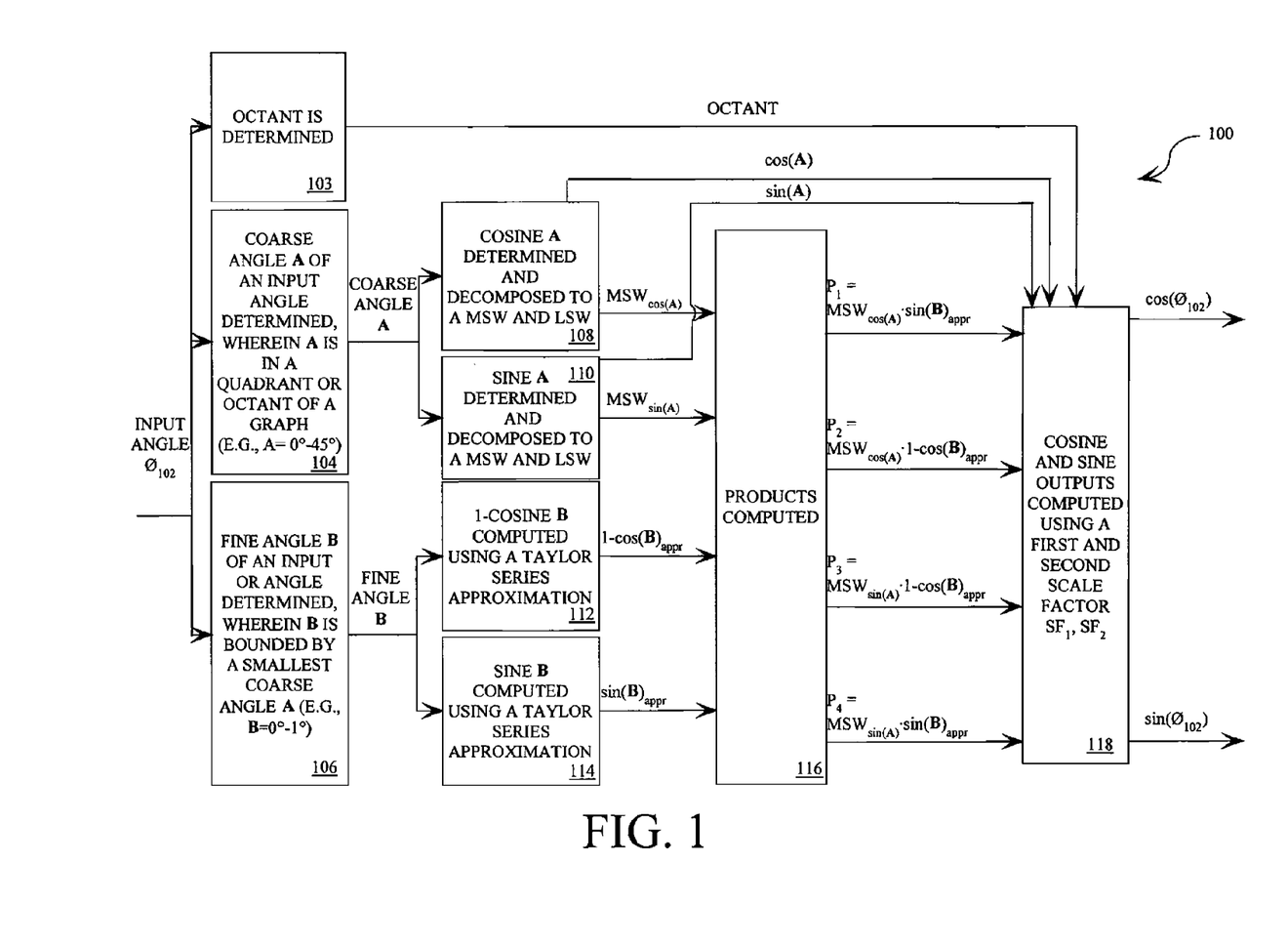
FIG. 1 is a conceptual diagram of a process for generating a sine and cosine of an input angle that is useful for understanding the present invention.

Referring now to FIG. 1, there is provided a conceptual diagram of a process 100 for generating a sine and cosine of an input angle that is useful for understanding the present invention. As shown in FIG. 1, the process 100 can begin by receiving an input angle $\emptyset_{102}$ from an external device (not shown). The external device can include, but is not limited to, an angle generator that generates angles between zero and three hundred sixty degrees (0°-360°), non-inclusive of the three hundred sixtieth degree (360°) using an input signal. Angle generators and sine/cosine generators are often used in a variety of communications system applications. Such communications system applications include, but are not limited to, digital up conversion applications, digital down conversion applications, and Fourier transform applications After receiving an input angle $\emptyset_{102}$, the sine and cosine generation process 100 continues with a first, second, and third determination step 103, 104, 106. The first determination step 103 extracts the three (3) most significant bits (MSBs) of the binary represented angular input and uses them to compute the octant of the input angle $\emptyset_{102}$. In this regard, it should be understood that step 103 can be provided by performing any method known to those having ordinary skill in the art for decomposing an angle into an octant designation. Those with ordinary skill in the art will recognize that step 103 may be implemented using simple digital logic and contributes three (3) effective bits of output accuracy to the final result. The outputs of step 103 are used to adjust the octant-agnostic sine/cosine evaluation calculated through the remainder of the sine and cosine generation process 100. The outputs of step 103 are also used to pre-adjust the fine angle evaluations for any symmetries and/or reflections applied.

It should be noted that the invention is not limited to octant symmetry based applications as shown in FIG. 1. The present invention can also be used in quadrant symmetry based application. In such a scenario, the first determination step 103 can alternatively involve extracting the two (2) most significant bits (MSBs) of the binary represented angular input and use them to compute the quadrant of the input angle $\emptyset_{102}$.

Referring again to FIG. 1, step 104 can generally involve decomposing the input angle $\emptyset_{102}$ to a coarse angle A. In this regard, it should be understood that the second determination step 104 can be provided by performing any method known in the art for decomposing an angle into a coarse angle A. For example, the second determination step 104 can involve truncating or rounding a binary representation of the input angle $\emptyset_{102}$ after a fixed number of bits to obtain a coarse angle A. In the case of octant symmetry (which is efficient in the concurrent computation of a cosine and sine), the coarse angle A is decomposed in the first octant exclusive of the three (3) most significant bits. If a rounding method is used, an adjustment (not shown) to the fine angle is required to recover the sign. In the case of quadrant symmetry, the coarse angle is decomposed in the first quadrant exclusive of the two (2) most significant bits. The invention is not limited in this regard.

Figure 2:
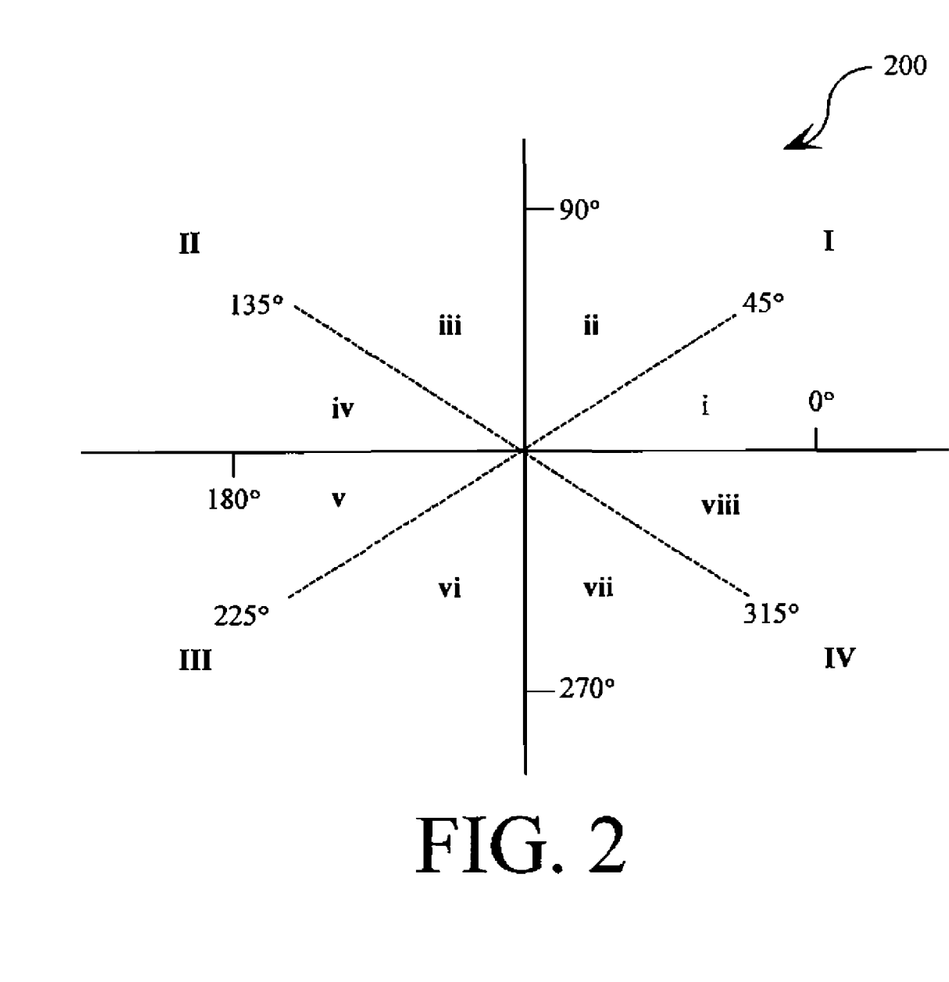
FIG. 2 is a two-dimensional graph illustrating quadrants and octants of a two dimensional space that is useful for understanding the present invention.

According to an embodiment of the invention, the coarse angle A is an angle in a two dimensional (2D) space. For example, the coarse angle A is one of a plurality of angles in a first octant or quadrant. A graph 200 illustrating a 2D space divided into quadrants and octants is provided in FIG. 2. As shown in FIG. 2, each quadrant I, II, III, IV is comprised of a plurality of angles residing in a respective ninety degree (90°) area which is non-inclusive of the ninetieth-degree (90°). The first quadrant I includes angles between zero degrees (0°) and ninety degrees (90°). The second quadrant II includes angles between ninety degrees (90°) and one hundred eight degrees (180°). The third quadrant III includes angles between one hundred eight degrees (180°) and two hundred seventy degrees (270°). The fourth quadrant IV includes angles between two hundred seventy degrees (270°) and three hundred sixty degrees (360°). Each octant i, ii, iii, iv, v, vi, vii, viii is comprised of a plurality of angles residing in a respective forty-five degree (45°) area. For example, the first octant i includes angles of zero degrees (0°) to forty-five degrees (45°) which is non-inclusive of the forty-fifth degree (45°). The invention is not limited in this regard.

Referring again to FIG. 1, the third determination step 106 can generally involve decomposing the input angle $\emptyset_{102}$ to a fine angle B in the first octant. In this regard, it should be understood that the third determination step 106 can be provided by performing any method known in the art for decomposing an input angle $\emptyset_{102}$ into a fine angle B. For example, the third determination step 106 can involve truncating or rounding a binary representation of an input phase angle $\emptyset_{102}$ after a fixed number of bits to obtain a remainder defining the fine angle B. The invention is not limited in this regard.

According to an embodiment of the invention, the fine angle B can be bounded by a smallest coarse angle A. For example, if the coarse angle A is in a first octant of a 2D space, then the fine angle B can be bounded by an angle less than or equal to one degree ($\leq 1°$). Still, the invention is not limited in this regard. The fine angle B can be bounded by any angle selected in accordance with a particular sine and cosine generation application.

The following Example is provided in order to further illustrate the first, second, and third determination steps 103, 104, 106. The scope of the invention, however, is not to be considered limited in any way thereby.

EXAMPLE 1

Assume that an input angle $\emptyset_{102}$ is sixty five degrees (65°) or 1.134464014 radians, which is approximately equivalent to 0.00101110001110000111 when scaled to a binary representation (where zero is zero degrees and one is three hundred sixty degrees non-inclusive). As such, only the representations 0.00000000000000000000 through 0.11111111111111111111 are allowed. In such a scenario, the first determination step 103 reduces the input angle $\emptyset_{102}$ to an angle between zero degrees (0°) to forty-five degrees (45°) through use of octant symmetry after the first octant results are computed. The angle between zero degrees (0°) to forty-five degrees (45°) is non-inclusive of the forty-fifth degree (45°). Octant symmetry is described in the following table.

| Input angle φ | Cosine output as a function of the first quadrant angle φ' (input angle modulo π/4) | Sin output as a function of the first quadrant angle φ' (input angle modulo π/4) |
|---|---|---|
| 0 ≦ φ < π/4 | Cos(φ') | Sin(φ') |
| π/4 ≦ φ < π/2 | Sin(π/4 − φ') | Cos(π/4 − φ') |
| π/2 ≦ φ < 3π/4 | −Sin(φ') | Cos(φ') |
| 3π/4 ≦ φ < π | −Cos(π/4 − φ') | Sin(π/4 − φ') |
| π ≦ φ < 5π/4 | −Cos(φ') | −Sin(φ') |
| 5π/4 ≦ φ < 3π/2 | −Sin(π/4 − φ') | −Cos(π/4 − φ') |
| 3π/2 ≦ φ < 7π/4 | Sin(φ') | −Cos(φ') |
| 7π/4 ≦ φ < 2π | Cos(π/4 − φ') | −Sin(π/4 − φ') |

As shown in the table, octant symmetry refers to three (3) concurrent natural symmetries of sinusoids that may be exploited, wherein the three (3) concurrent natural symmetries include an even symmetry of a cosine function, an odd symmetry of a sine function, and a reflective symmetry of the sine and cosine functions about lines offset from the coordinate axes by π/4 radians (45 degrees). The result of these symmetry properties is that a hardware implementation of any sinusoid may obtain an effective three (3) bit precision increase from reflecting the input angle to the first quadrant, calculate resulting sine and cosine values in the first octant, and reverse a reflection to obtain actual sine and cosine function evaluations. In numerical terms, the octant symmetry may be viewed as the signs and the reflection across π/4 integer multiple boundaries.

After applying octant symmetry rules to the computed result for an angle in the first octant, the input angle $\emptyset_{102}$ is reduced to twenty degrees (20°) or 0.349065850 radians. In a binary representation, this angle is approximately 0.00001110001110000111. The coarse angle A can be selected as the first eight bits following the first three bits used to determine octant symmetry, i.e., the coarse angle A has a binary representation of 01110001. The fine angle B can be selected as the remaining bits to the right of the decimal point of the above listed binary sequence, i.e., the fine angle B has a binary representation of 11000111.

As shown in the above provided table, the third most significant bit (MSB) determines when the cosine and sine angles are inverted about a twenty-two and a half degree (22.5°) reflected point. The exclusive ORing of the two (2) bits below the most significant bit (MSB) determines when the final computed first octant cosine and sine are transposed to the sine and cosine outputs. The exclusive ORing of the MSB and the bit below the MSB determines when to negate the output sine value while the MSB determines when to negate the output cosine value.

As noted above, the present invention is not limited to octant symmetry based application. For example, the present invention can also be used in quadrant symmetry application. Quadrant symmetry is described in the following table.

| Input angle φ | Cosine output as a function of the first quadrant angle φ' (input angle modulo π/4) | Sin output as a function of the first quadrant angle φ' (input angle modulo π/4) |
|---|---|---|
| 0 ≦ φ < π/2 | Cos(φ') | Sin(φ') |
| π/2 ≦ φ < π | −Sin(φ') | Cos(φ') |
| π ≦ φ < 3π/2 | −Cos(φ') | −Sin(φ') |
| 3π/2 ≦ φ < 2π | Sin(φ') | −Cos(φ') |

As shown in the table, quadrant symmetry refers to three (3) concurrent natural symmetries of sinusoids that may be exploited, wherein the three (3) concurrent natural symmetries include an even symmetry of a cosine function, an odd symmetry of a sine function, and a reflective symmetry of the sine and cosine functions about lines offset from the coordinate axes by π/2 radians (or 90 degrees).

Referring again to FIG. 1, the process 100 continues with a plurality of computational steps 108, 110, 112, 114, 116, 118. These computational steps 108, 110, 112, 114, 116, 118 are performed for determining a sine and cosine of the input angle $Ø_{102}$ modulo π/k using the previously determined coarse angle A and fine angle B. k is a value selected in accordance with a particular type of symmetry employed. If the octant symmetry is employed, then k is selected to be four (4) so that π/k has a value equal to forty-five degrees (45°). In contrast, k is selected to be two (2) when quadrant symmetry is employed so that π/k has a value equal to ninety-degrees (90°).

The sine and cosine of the input angle $Ø_{102}$ modulo π/k can be defined by the following mathematical expressions (1) and (2). The input angle $Ø_{102}$ modulo k is defined as an input angle $Ø'_{102}$, $$\sin(Ø'_{102}) = \sin(A)\cos(B) + \cos(A)\sin(B) \quad (1)$$

$$\cos(Ø'_{102}) = \cos(A)\cos(B) - \sin(A)\sin(B) \quad (2)$$

where:
$\sin(Ø'_{102})$ is the sine of the input angle $Ø_{102}$ modulo π/k;
$\cos(Ø'_{102})$ is the cosine of the input angle $Ø_{102}$ modulo π/k;
sin(A) is a sine of a coarse angle A;
cos(A) is a cosine of coarse angle B;
cos(B) is a cosine of a fine angle B; and
sin(B) is a sine of a fine angle B.

However, it should be understood that the mathematical expressions (1) and (2) only provide finite precision sine and cosine trigonometric computations, i.e., the equality statements in mathematical expressions (1) and (2) hold within some small bounded error. The desired output precision drives the precision required in intermediate computations as well as how precise the approximations of terms in mathematical expressions (1) and (2) must be, which in turn leads to more hardware processing. As such, the mathematical expressions (1) and (2) need to be modified to exploit controlled finite precision approximations of the sine and cosine trigonometric computations that are hardware efficient. Such modifications can generally involve computing approximations of the sine of the fine angle B, the cosine of the fine angle B, the sine of the input angle $Ø'_{102}$, and the cosine of the input angle $Ø'_{102}$. The particularities and advantages of these modifications will become more evident as the discussion progresses.

As shown in FIG. 1, the cosine of the coarse angle A is determined during the first computational step 108. The cosine determination can generally involve computing the cosine of the coarse angle A or performing look up table operations to select a pre-computed value for the cosine of the coarse angle A. Thereafter, the cosine of the coarse angle A is decomposed to a most significant word $MSW_{cos(A)}$ and a least significant word $LSW_{cos(A)}$. The term "decompose" as used herein refers to a process of breaking a value (e.g., cos(A) or sin(A)) to its constituent or component parts. The decomposition process can generally involve computing values for the most significant word of cos(A) ($MSW_{cos(A)}$) and least significant word of cos(A) ($LSW_{cos(A)}$). Alternatively, the decomposition process can involve performing look up table operations to select pre-computed values for $MSW_{cos(A)}$ and/or $LSW_{cos(A)}$. It should be noted that the cosine determination and decomposition process can collectively involve performing look up table operations to select pre-computed values for $MSW_{cos(A)}$ and/or $LSW_{cos(A)}$. The phrase "most significant word" as used herein refers to a set of left most $M_1$ bits of a binary string representing the cosine or sine of the coarse angle A. The phrase "least significant word" as used herein refers to a set of right most $M_2$ bits of a binary string representing the cosine or sine of the coarse angle A. The value of $M_1$ can be the same as or different from the value of $M_2$.

Similarly, the sine of the coarse angle A is determined during the second computational step 110. The sine determination can generally involve computing the sine of the coarse angle A or performing look up table operations to select pre-computed values for the sine of the coarse angle A. Thereafter, the sine of the coarse angle A is decomposed to a most significant word $MSW_{sin(A)}$ and a least significant word $LSW_{sin(A)}$. The decomposition process can generally involve computing values for the most significant word of sin(A) ($MSW_{sin(A)}$) and least significant word of sin(A) ($LSW_{sin(A)}$). Alternatively, the decomposition process can involve performing look up table operations to select pre-computed values for $MSW_{sin(A)}$ and/or $LSW_{sin(A)}$. It should be noted that the sine determination and decomposition process can collectively involve performing look up table operations to select pre-computed values for $MSW_{sin(A)}$ and/or $LSW_{sin(A)}$.

Notably, the cosine and sine of the coarse angle A are decomposed to a most and least significant word for purposes of efficient hardware (e.g., look up table) implementations. In this regard, it should be understood that the address space of the coarse and fine angles A, B need not be approximately the same. However, the coarse angle A trigonometric values stored in one or more look up tables need to have an accuracy which allows for computing a desired output accuracy. Subsequent operations can be performed to apply angle sum trigonometric identities to the most significant words, thereby minimizing a hardware implementation of the present invention (i.e., less multipliers are needed for a hardware implementation as compared to conventional sine/cosine generators).

Referring again to FIG. 1, an approximation of one minus the cosine of the fine angle B is computed during the third computational step 112. It should be noted that the approximation of 1−cos(B) is computed instead of an approximation of cos(B) for a variety of reasons, such as providing an efficient hardware implementation.

In this regard, it should be understood that if the fine angle B is a small angle then the cosine of the fine angle B is approximately equal to one (1). Therefore, if the cosine of the fine angle B is greater than or equal to $1-2^{-16}$ and an output computation requires a fine angle accuracy of $2^{-23}$, then twenty-four (24) bits are required to store the cosine of the fine angle B in a look up table. However, only eight (8) least significant bits are required to store values for one minus the cosine of the fine angle B since the sixteen (16) most significant bits are a priori known to have values equal to zero (0). As a result, no storage is required for and no operations are required to combine the most significant bits of the words with another word.

According to an embodiment of the invention, the approximation computational step 112 can involve Taylor Series Approximations. Taylor Series Approximations are well known to those having ordinary skill in the art, and therefore will not be described in great detail herein. However, it should be understood that the Taylor Series Approximation employed in the third computational step 112 can be defined by the following mathematical equation (3).

$$1-\cos(2\pi A) = 1-[1-[(2\pi A)^2/2!]+[(2\pi A)^4/4!]-[(2\pi A)^6/6!]+\ldots] \quad (3)$$

Still, the invention is not limited in this regard. Any known method known to those having ordinary skill in the art for computing an approximation of a cosine of an angle can be used.

Referring again to FIG. 1, the sine of the fine angle B is computed during the fourth computational step 114. According to an embodiment of the invention, the approximation computational step 114 can involve Taylor Series Approximations. Taylor Series Approximations are well known to those having ordinary skill in the art, and therefore will not be described in great detail herein. However, it should be understood that the Taylor Series Approximation employed in the fourth computational step 114 can be defined by the following mathematical equation (4).

$$\sin(2\pi B) = (2\pi B) - [(2\pi B)^3/3!] + [(2\pi B)^5/5!] - [(2\pi B)^7/7!] + \ldots \quad (4)$$

Still, the invention is not limited in this regard. Any known method known to those having ordinary skill in the art for computing an approximation of a sine of an angle can be used.

It should be noted that each of the mathematical equations (3) and (4) can be a Taylor Series of an $N^{th}$ order selected for providing an n bit precision. The n bit precision can be any bit precision selected in accordance with a particular sine/cosine generation application. However, it should be appreciated that such a Taylor Series based sine and cosine generation process 100 overcomes the limitations of conventional sine/cosine generators. For example, the Taylor Series based sine and cosine generation process 100 can efficiently provide a sine and cosine generation with a bit precision greater than an eighteen (18) bit precision. Still, the invention is not limited in this regard. Notably, only two (2) expansion terms in mathematical equations (3) and (4) need to be computed to achieve a twenty-four bit precision, i.e., $1-\cos(2\pi A)=1-[1-[(2\pi A)^2/2!]$ and $\sin(2\pi B)=(2\pi B)-[(2\pi B)^3/3!]$.

Referring again to FIG. 1, the process 100 continues with the fifth computational step 116. During the fifth computational step 116, a plurality of products $P_1$, $P_2$, $P_3$, $P_4$ are computed. The products $P_1$, $P_2$, $P_3$, $P_4$ can be defined by the following mathematical equations (5)-(8).

$$P_1 = MSW_{cos(A)} \cdot \sin(B)_{appr} \quad (5)$$

$$P_2 = MSW_{cos(A)} \cdot [1-\cos(B)_{appr}] \quad (6)$$

$$P_3 = MSW_{sin(A)} \cdot [1-\cos(B)_{appr}] \quad (7)$$

$$P_4 = MSW_{sin(A)} \cdot \sin(B)_{appr} \quad (8)$$

where:
$MSW_{cos(A)}$ is the most significant word of the cosine of the coarse angle A;
$\sin(B)_{appr}$ is the approximation of the sine of the fine angle B;
$1-\cos(B)_{appr}$ is the approximation of one minus the cosine of the fine angle B; and
$MSW_{sin(A)}$ is the most significant word of the sine of the coarse angle A.

After computing the products $P_1, \ldots, P_4$, the process 100 continues with a sixth computational step 118. During the sixth computational step 118, the cosine and sine of the input angle $\varnothing_{102}$ are computed. In this regard, it should be understood that the sixth computational step 118 can generally involve computing approximations to the cosine and sine of the input angle $\varnothing_{102}$ using the product terms $P_1, \ldots, P_4$, the coarse angle sinusoid evaluation, $\cos(A)$, $\sin(A)$, and the selected octant from determination step 103. The approximations in the first octant can be defined by the following mathematical equations (9) and (10).

$$\cos(\varnothing'_{102})_{appr} = [\cos(A) - P_2] - P_4 = [\cos(A) - [MSW_{cos(A)} \cdot [1-\cos(B)_{appr}]]] - [MSW_{sin(A)} \cdot \sin(B)_{appr}] \quad (9)$$

$$\sin(\varnothing'_{102})_{appr} = P_1 + [\sin(A) - P_3] = [MSW_{cos(A)} \cdot \sin(B)_{appr}] + [\sin(A) - [MSW_{sin(A)} \cdot [1-\cos(B)_{appr}]]] \quad (10)$$

where:
$\cos(\varnothing'_{102})_{appr}$ is an approximation to a cosine of the input angle $\varnothing_{102}$ modulo $\pi/k$;
$\sin(\varnothing'_{102})_{appr}$ is an approximation to a sine of the input angle $\varnothing_{102}$ modulo $\pi/k$. The first octant approximations are mapped to the required octant in the sixth computational step 118.

The approximations to the cosine and sine of the input angle $\varnothing_{102}$ (computed in the sixth computational step 118) given in mathematical equations (9) and (10) are not of the desired resolution. The term "resolution" as used herein refers to a numerical accuracy of a result of a computation or series of computations. As such, additional computations must be performed for obtaining the cosine and sine of the input angle $\varnothing'_{102}$ that are of the desired resolution. The additional computations can be defined by the following mathematical equations (11) and (12).

$$\cos(\varnothing_{102}) = [\sin(\varnothing_{102})_{appr} \cdot SF_1] + \cos(\varnothing_{102})_{appr} \quad (11)$$

$$\sin(\varnothing_{102}) = [\cos(\varnothing_{102})_{appr} \cdot SF_2] + \sin(\varnothing_{102})_{appr} \quad (12)$$

where:
$\cos(\varnothing_{102})$ is the sine of the input angle $\varnothing_{102}$;
$\sin(\varnothing_{102})$ is the sine of the input angle $\varnothing_{102}$;
$SF_1$ is a first scale factor; and
$SF_2$ is a second scale factor.

According to an embodiment of the invention, the first and second scale factors $SF_1$, $SF_2$ are a function of the weighting of the most significant word of the cosine of the coarse angle $MSW_{cos(A)}$ and the most significant word of the sine of the coarse angle $MSW_{sin(A)}$. The term "function" as used here refers to a mathematical relation in which each element of one word is associated with at least one element of another word. The term "weighting" as used herein refers to a process of aligning binary points of two (2) most significant words on their locations in a combined word and not in separate words. For example, a combined word is defined as $a_0 2^0 + a_1 2^{-1} + a_2 2^{-2} + a_3 2^{-3} + a_4 2^{-4} + a_5 2^{-5} + a_6 2^{-6} + a_7 2^{-7} + a_8 2^{-8} + a_9 2^{-9} + a_{10} 2^{-10} + a_{11} 2^{-11} + a_{12} 2^{-12} + a_{13} 2^{-13} + a_{14} 2^{-14} + a_{15} 2^{-15} + a_{16} 2^{-16} + a_{17} 2^{-17} + a_{18} 2^{-18} + a_{19} 2^{-19} + a_{20} 2^{-20} + a_{21} 2^{-21} + a_{22} 2^{-22} + a_{23} 2^{-23}$. The combined word is broken into the following two (2) words having the same implied binary point positions: $a_0 2^0 + a_1 2^{-1} + a_2 2^{-2} + a_3 2^{-3} + a_4 2^{-4} + a_5 2^{-5} + a_6 2^{-6} + a_7 2^{-7} + a_8 2^{-8} + a_9 2^{-9} + a_{10} 2^{-10} + a_{11} 2^{-11}$; and $a_{12} 2^0 + a_{13} 2^{-1} + a_{14} 2^{-2} + a_{15} 2^{-3} + a_{16} 2^{-4} + a_{17} 2^{-5} + a_{18} 2^{-6} + a_{19} 2^{-7} + a_{20} 2^{-8} + a_{21} 2^{-9} + a_{22} 2^{-10} + a_{23} 2^{-11}$. In such a scenario, the least significant word must be weighted by $2^{-12}$ before the least significant word can be combined with the most significant word to obtain the combined word. Still, the invention is not limited in this regard.

Figure 3A:
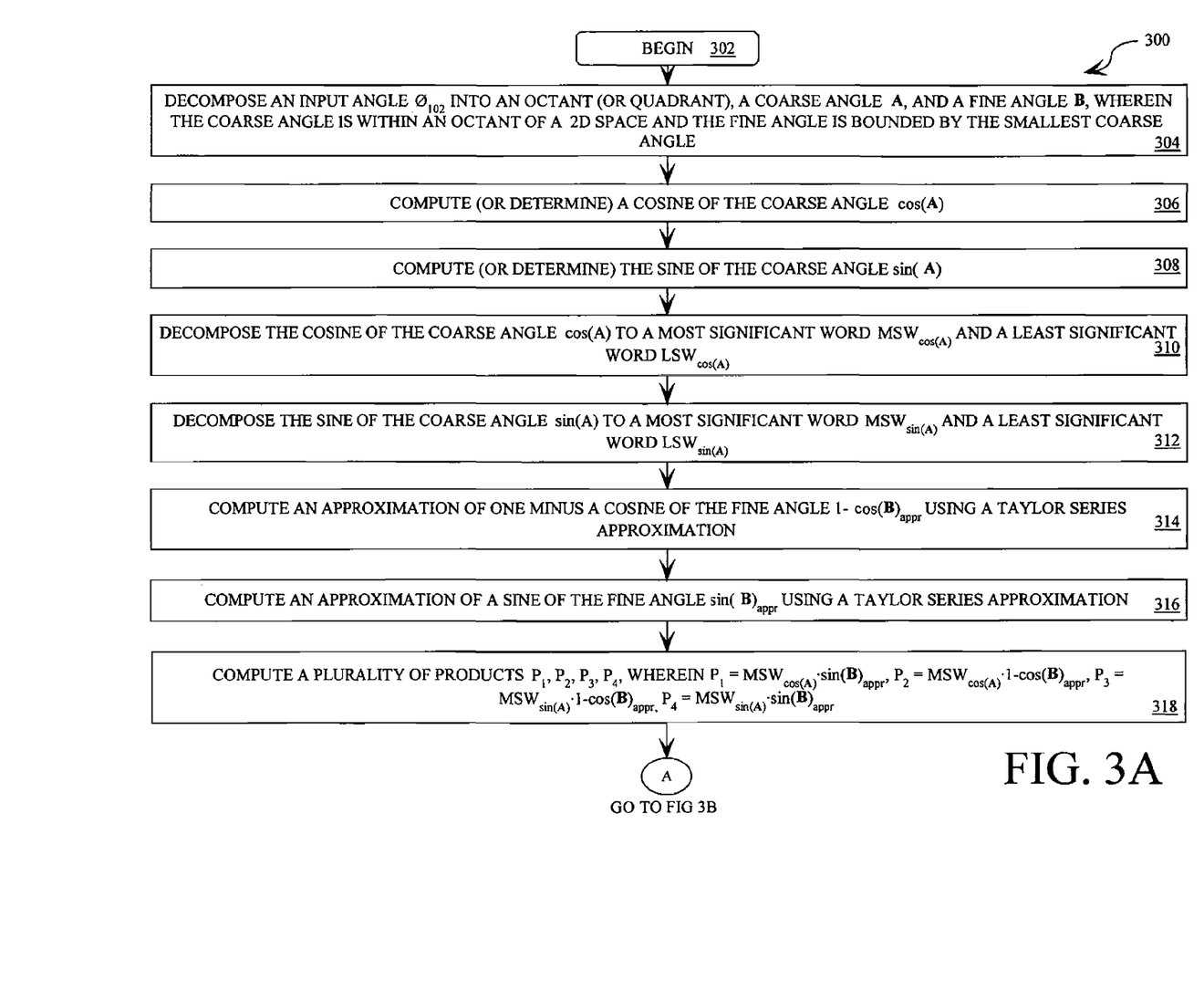
FIGS. 3A-3B collectively provide a flow diagram of a method for generating a sine and cosine of an input angle that is useful for understanding the present invention.
Figure 3B:
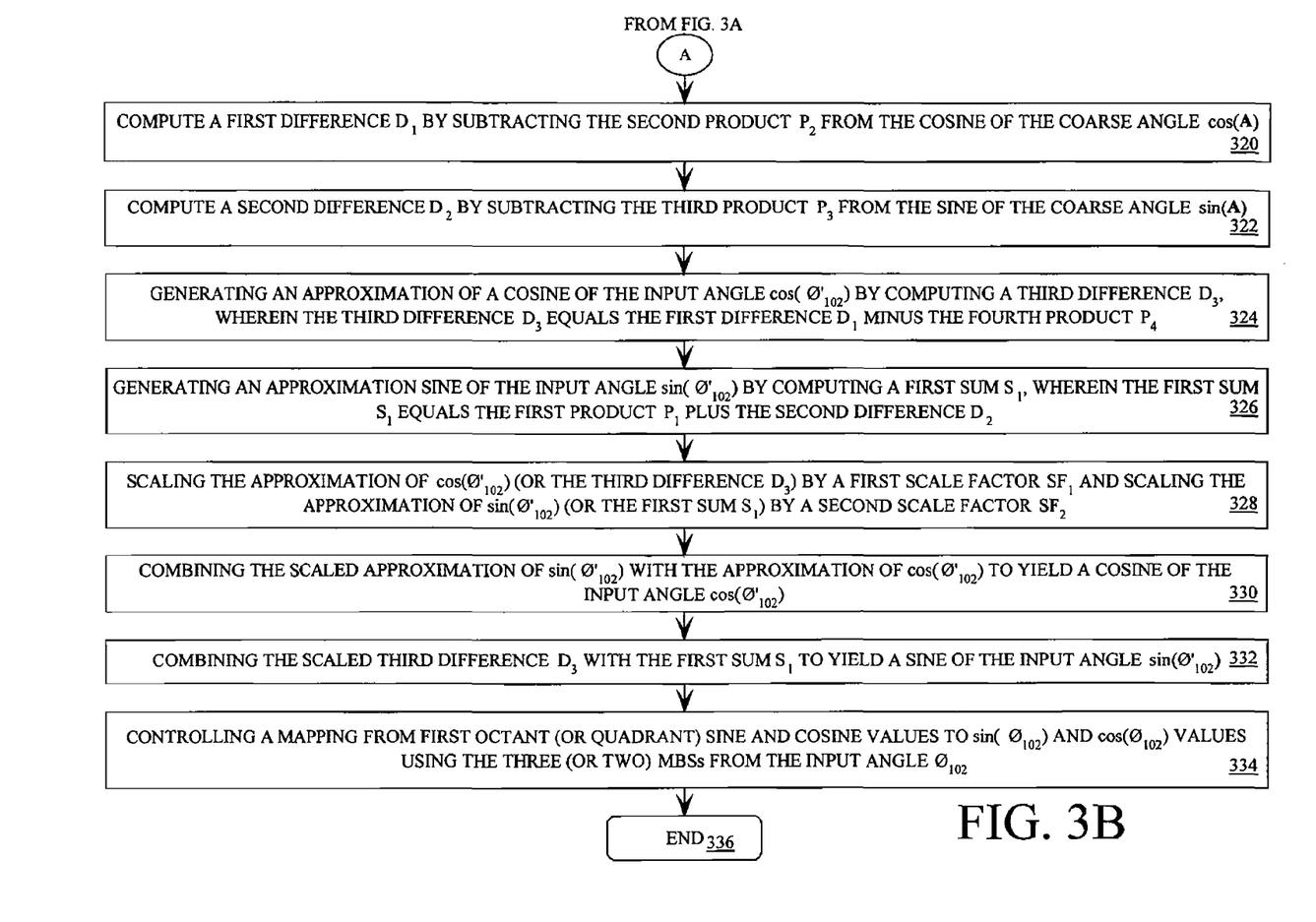

FIGS. 3A-3B and accompanying text described below illustrate an exemplary method 300 according to an embodiment of the invention. The method 300 is provided for generating a sine and cosine of an input angle $\varnothing_{102}$. It should be appreciated, however, that the method 300 disclosed herein is provided for purposes of illustration only and that the present invention is not limited solely to the particular method shown.

Referring now to FIG. 3A, there is provided a method for generating a sine and cosine of an input angle $\varnothing_{102}$ that is useful for understanding the present invention. As shown in FIG. 3A, the method begins at step 302 and continues with step 304. In step 304, an input angle $\varnothing_{102}$ is decomposed into an octant (or quadrant), a coarse angle A, and a fine angle B. As noted above, the fine angle B can be bounded by a smallest coarse angle A.

After step 304, the method 300 continues with step 306. In step 306, a cosine of the coarse angle A is computed or determined using look-up table operations. Look-up table operations are well known to those having ordinary skill in the art, and therefore will not be described in herein. Subsequently, step 308 is performed where the sine of the coarse angle A is computed or determined using look-up table operations. Thereafter, steps 310 and 312 are performed for decomposing cos(A) and sin(A) to a most significant word and a least significant word.

In step 314, an approximation of one minus the cosine of the fine angle B is computed. As noted above, this approximation can be obtained using a Taylor Series Approximation. Similarly, an approximation of the sine of the fine angle B is computed in step 316. This approximation can also be obtained using a Taylor Series Approximation.

After completing step 316, step 318 is performed where a plurality of products $P_1, \ldots, P_4$ are computed using the previously computed or determined values for the most significant word of the cosine of the coarse angle A, the most significant word of the sine of the coarse angle A, the approximation of the sine of the fine angle B, and the approximation of one minus the cosine of the fine angle B. Each of the products $P_1, \ldots, P_4$ is described above in relation to FIG. 1 and mathematical equations (5) through (8). The description above is sufficient for understanding the product $P_1, \ldots, P_4$ computations. Notably, the level of precision in calculating the product terms varies $P_1, \ldots, P_4$ and is chosen based on the overall desired output precision. Subsequent to computing the products $P_1, \ldots, P_4$, the method 300 continues with a step 320 of FIG. 3B.

Referring now to FIG. 3B, a first difference $D_1$ is computed in step 320. The first difference is obtained by subtracting the second product $P_2$ from the cosine of the coarse angle A. Accordingly, the first difference can be defined by the following mathematical equation (13).

$$D_1 = \cos(A) - P_2 \qquad (13)$$

Similarly, a second difference $D_2$ is computed in step 322. The second difference $D_2$ is obtained by subtracting the third product $P_3$ from the sine of the coarse angle A. As such, the second difference $D_2$ can be defined by the following mathematical equation (14).

$$D_2 = \sin(A) - P_3 \qquad (14)$$

In step 324, an approximation of the cosine of the input angle $\varnothing'_{102}$ is generated by computing a third difference $D_3$. The third difference $D_3$ is computed by subtracting the fourth product $P_4$ from the first difference $D_1$. Accordingly, the approximation of the cosine of the input angle $\cos(\varnothing'_{102})_{appr}$ can be defined by the above recited mathematical equation (9) and the following mathematical equation (15).

$$\cos(\varnothing'_{102})_{appr} = D_3 = D_1 - P_4 \qquad (15)$$

After completing step 324, the method 300 continues with step 326.

In step 326, an approximation to the sine of the input angle $\varnothing'_{102}$ is generated by computing a first sum $S_1$. The first sum $S_1$ is computed by adding together the first product $P_1$ and the second difference $D_2$. As such, the approximation of the sine of the input angle $\sin(\varnothing'_{102})_{appr}$ can be defined by the above recited mathematical equation (10) and the following mathematical equation (16).

$$\sin(\varnothing'_{102})_{appr} = D_2 + P_1 \qquad (16)$$

Subsequently, the method 300 continues with step 328.

In step 328, the approximation of $\cos(\varnothing'_{102})$ is scaled by a first scale factor $SF_1$ to place the same in a desired resolution. Step 328 also involves scaling the approximation of sin $(\varnothing'_{102})$ by a second scale factor $SF_2$ to place the same in a desired resolution. These scaling operations can be defined by the following mathematical equations (17) and (18).

$$\cos(\varnothing'_{102})_{appr}' = \cos(\varnothing'_{102})_{appr} \cdot SF_1 = D_3 \cdot SF_1 \qquad (17)$$

$$\sin(\varnothing'_{102})_{appr}' = \sin(\varnothing'_{102})_{appr} \cdot SF_2 = S_1 \cdot SF_2 \qquad (18)$$

After scaling the approximation of the cosine and sine of the input angle $\varnothing'_{102}$, the method 300 continues with step 330. In step 330, the cosine of the input angle $\varnothing'_{102}$ is computed (or determined). More particularly, the scaled approximation of the sine of the input angle $\sin(\varnothing'_{102})_{appr}'$ is combined with the approximation of the cosine of the input angle $\cos(\varnothing'_{102})_{appr}$ to yield the cosine of the input angle $\varnothing'_{102}$. This computation (or determination) can be defined by the above recited mathematical equation (11) and the following mathematical equation (19).

$$\cos(\varnothing'_{102}) = \sin(\varnothing'_{102})_{appr}' + \cos(\varnothing'_{102})_{appr} \qquad (19)$$

Similarly, the sine of the input angle $\varnothing'_{102}$ is computed or determined in step 332. Step 332 can generally involve combining the scaled approximation of the cosine of the input angle $\cos(\varnothing'_{102})_{appr}'$ with the approximation of the sine of the input angle $\sin(\varnothing'_{102})_{appr}$ to yield the sine of the input angle $\varnothing'_{102}$. This computation or determination can be defined by the above recited mathematical equation (12) and the following mathematical equation (20).

$$\sin(\varnothing'_{102}) = \cos(\varnothing'_{102})_{appr}' + \sin(\varnothing'_{102})_{appr} \qquad (20)$$

Notably, the scaled additions are provided as an adjustment that makes the hardware implementation more efficient and may be replaced by similar approximations without loss of generality. After completing step 332, step 334 is performed.

In step 334, N MSBs from the input angle $\varnothing_{102}$ are used to control the mapping from $\sin(\varnothing'_{102})$ and $\cos(\varnothing'_{102})$ values to the $\sin(\varnothing_{102})$ and $\cos(\varnothing_{102})$ values described previously in the mapping table. N is selected in accordance with a particular type of symmetry employed. For example, if octant symmetry is employed, then N is selected to be three (3). If quadrant symmetry is employed, then N is selected to be two (2). After completing step 334, step 336 is performed where the method 300 ends.

Figure 4:
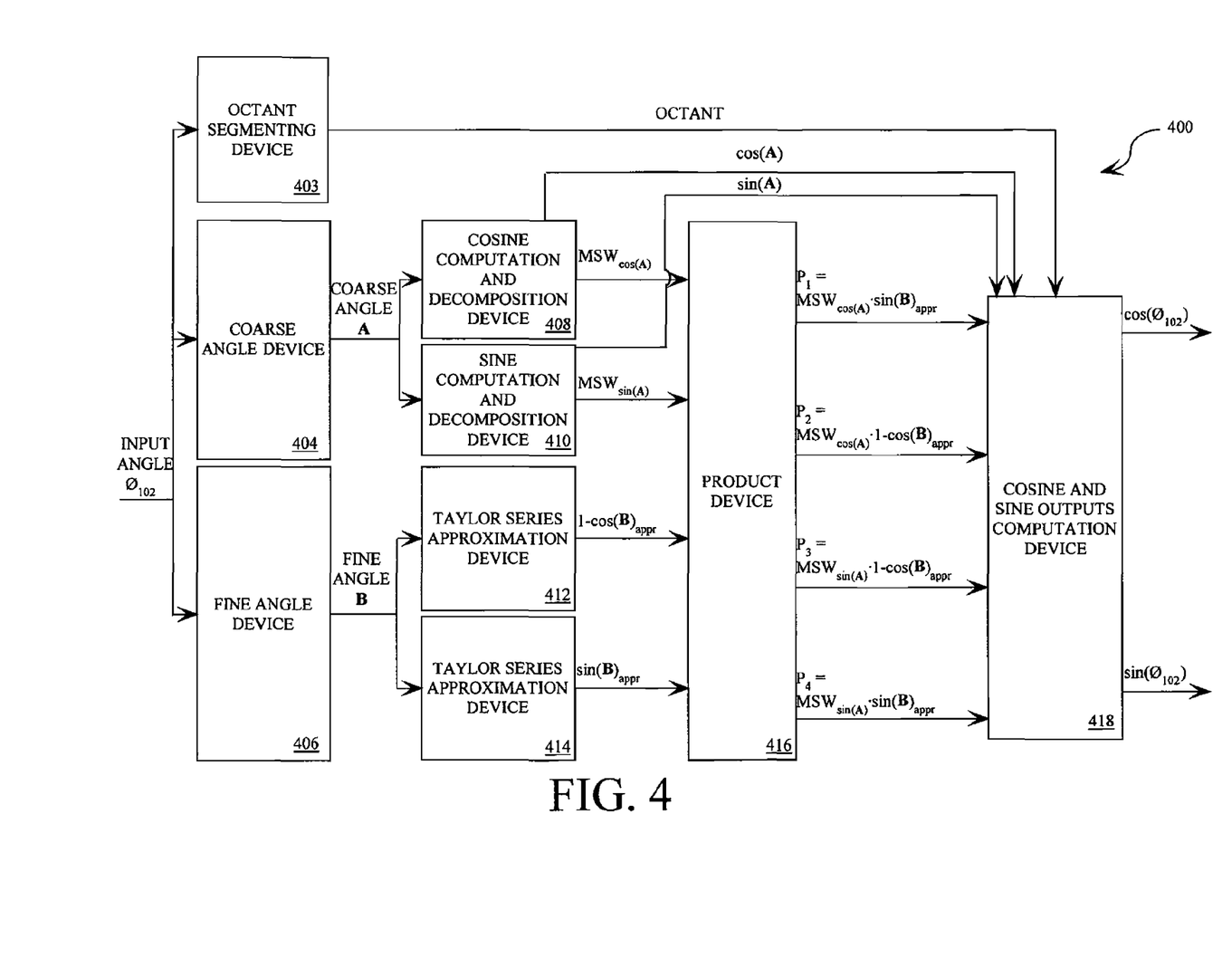
FIG. 4 is a block diagram of an exemplary sine/cosine generator that is useful for understanding the present invention.

Referring now to FIG. 4, there is provided an exemplary sine/cosine generator 400 that is useful for understanding the present invention. It should be noted that the sine/cosine generator 400 implements the method 300 described above in relation to FIGS. 3A and 3B. As shown in FIG. 4, the sine/cosine generator 400 is comprised of an octant segmenting device 403, a coarse angle device (CAD) 404, a fine angle device (FAD) 406, a cosine computation and decomposition device (CCDD) 408, a sine computation and decomposition device (SCDD) 410, and Taylor Series Approximation devices (TSADs) 412, 414. The sine/cosine generator 400 is also comprised of a product device 416 and a cosine and sine computation device (CSCD) 418.

The octant segmenting device 403 is comprised of hardware and/or software configured for receiving an input angle $\varnothing_{102}$ and determining the octant of the input angle $\varnothing_{102}$. It should be understood that that octant segmenting device 403 can employ any method known to those having ordinary skill in the art for decomposing an angle into an octant designation. The octant segmenting device 403 is also comprised of hardware and/or software configured for communicating the determined octant to the CSCD 418. The invention is not limited in this regard. For example, the sine/cosine generator 400 can alternatively include a quadrant segmenting device (not shown).

Referring again to FIG. 4, the CAD 404 is comprised of hardware and/or software configured for receiving an input angle $\emptyset_{102}$ and determining the coarse angle A of the same. As noted above, the coarse angle A can be one of a plurality of angles selected from the first octant (or quadrant if quadrant symmetry is employed). The CAD 404 is also comprised of hardware and/or software configured for communicating the coarse angle A to the CCDD 408 and the SCDD 410.

The CCDD 408 is comprised of hardware and/or software configured for computing or determining the cosine of the coarse angle A and decomposing the same to a most significant word and a least significant word. The CCDD 408 is also comprised of hardware and/or software configured for communicating the most significant word of the cosine of the coarse angle A to the product device 416. The CCDD 408 is further comprised of hardware and/or software configured for communicating the cosine of the coarse angle A to the CSCD 418.

It should be understood that the CCDD 408 can be comprised of one or more look up tables containing pre-computed values for the cosine of the coarse angle A, the most significant word, and/or the least significant word. The pre-computed values can be expressed as a binary number system representation. Stated differently, each of the pre-computed values can be expressed as a string of bits, wherein each bit has a one (1) value or a zero (0) value. Still, the invention is not limited in this regard. The pre-computed values can be expressed in any number system representation selected in accordance with a particular sine/cosine generator 400 application.

According to an embodiment of the invention, the least significant word is scaled such that all bits stored in the look up table(s) are significant. Also, the results of the arithmetic operations based on the content of the look up table(s) are scaled as the inverse of the look up table scaling. For example, a combined word is defined as $a_0 2^0 + a_1 2^{-1} + a_2 2^{-2} + a_3 2^{-3} + a_4 2^{-4} + a_5 2^{-5} + a_6 2^{-6} + a_7 2^{-7} + a_8 2^{-8} + a_9 2^{-9} + a_{10} 2^{-10} + a_{11} 2^{-11} + a_{12} 2^{-12} + a_{13} 2^{-13} + a_{14} 2^{-14} + a_{15} 2^{-15} + a_{16} 2^{-16} + a_{17} 2^{-17} + a_{18} 2^{-18} + a_{19} 2^{-19} + a_{20} 2^{-20} + a_{21} 2^{-21} + a_{22} 2^{-22} + a_{23} 2^{-23}$. The combined word is broken into the following two (2) words having the same implied binary point positions: $a_0 2^0 + a_1 2^{-1} + a_2 2^{-2} + a_3 2^{-3} + a_4 2^{-4} + a_5 2^{-5} + a_6 2^{-6} + a_7 2^{-7} + a_8 2^{-8} + a_9 2^{-9} + a_{10} 2^{-10} + a_{11} 2^{-11} + 0 \mathrm{X} 2^{-12} + 0 \mathrm{X} 2^{-13} + 0 \mathrm{X} 2^{-14} + 0 \mathrm{X} 2^{-15} + 0 \mathrm{X} 2^{-16} + 0 \mathrm{X} 2^{-17} + 0 \mathrm{X} 2^{-18} + 0 \mathrm{X} 2^{-19} + 0 \mathrm{X} 2^{-20} + 0 \mathrm{X} 2^{-21} + 0 \mathrm{X} 2^{-22} + 0 \mathrm{X} 2^{-23}$; and $0 \mathrm{X} 2^0 + 0 \mathrm{X} 2^{-1} + 0 \mathrm{X} 2^{-2} + 0 \mathrm{X} 2^{-3} + 0 \mathrm{X} 2^{-4} + 0 \mathrm{X} 2^{-5} + 0 \mathrm{X} 2^{-6} + 0 \mathrm{X} 2^{-7} + 0 \mathrm{X} 2^{-8} + 0 \mathrm{X} 2^{-9} + 0 \mathrm{X} 2^{-10} + 0 \mathrm{X} 2^{-11} + a_{12} 2^{-12} + a_{13} 2^{-13} + a_{14} 2^{-14} + a_{15} 2^{-15} + a_{16} 2^{-16} + a_{17} 2^{-17} + a_{18} 2^{-18} + a_{19} 2^{-19} + a_{20} 2^{-20} + a_{21} 2^{-21} + a_{22} 2^{-22} + a_{23} 2^{-23}$. As should be understood, the digits that are identically zero (0) have no significance. Therefore, only the significant digits of the two (2) words need to be stored. More particularly, the last twelve (12) bits of the first word are discarded and the first twelve (12) bits are stored as the most significant word. Similarly, the first twelve (12) bits of the second word are discarded, the bit weights of the last twelve (12) bits of the second word are scaled by $2^{12}$, and the scaled last twelve (12) bits are stored as the least significant word. Still, the invention is not limited in this regard.

Referring again to FIG. 4, the SCDD 410 is comprised of hardware and/or software configured for computing or determining the sine of the coarse angle A and decomposing the same to a most significant word and a least significant word. The SCDD 410 is also comprised of hardware and/or software configured for communicating the most significant word of the sine of the coarse angle A to the product device 416. The SCDD 410 is further comprised of hardware and/or software configured for communicating the sine of the coarse angle A to the CSCD 418.

It should be understood that the SCDD 410 can be comprised of one or more look up tables containing pre-computed values for the sine of the coarse angle A, the most significant word, and/or the least significant word. The pre-computed values can be expressed as a binary number system representation. Stated differently, each of the pre-computed values can be expressed as a string of bits, each bit having a one (1) value or a zero (0) value. Still, the invention is not limited in this regard. The pre-computed values can be expressed in any number system representation selected in accordance with a particular sine/cosine generator 400 application.

According to an embodiment of the invention, the least significant word is scaled such that all bits stored in the look up table(s) are significant. Also, the results of the arithmetic operations based on the content of the look up table(s) are scaled as the inverse of the look up table scaling. Still, the invention is not limited in this regard.

Referring again to FIG. 4, the FAD 406 is comprised of hardware and/or software configured for receiving an input angle $\emptyset_{102}$ and determining the fine angle B of the same. As noted above, the fine angle B can be bounded by the smallest coarse angle A. The FAD 406 is also comprised of hardware and/or software configured for communicating the fine angle B to the TSADs 412, 414.

The TSAD 412 is comprised of hardware and/or software configured for computing or determining an approximation of one minus the cosine of the fine angle B. This computation or determination can involve a Taylor Series Approximation. The Taylor Series Approximation can involve using a Taylor Series of an $N^{th}$ order selected for providing at least an n bit precision output. The TSAD 412 is also comprised of hardware and/or software configured for communicating the approximation of one minus the cosine of the fine angle B to the product device 416. It should be noted that the TSAD 412 can be comprised of one or more look up tables containing pre-computed values for the approximation of one minus the cosine of the fine angle B or other fine angle approximations.

The TSAD 414 is comprised of hardware and/or software configured for computing or determining an approximation of sine of the fine angle B. This computation or determination can involve a Taylor Series Approximation. The Taylor Series Approximation can involve using a Taylor Series of an $N^{th}$ order selected for providing an n bit precision. The TSAD 414 is also comprised of hardware and/or software configured for communicating the approximation of sine of the fine angle B to the product device 416. It should be noted that the TSAD 414 can be comprised of one or more look up tables containing pre-computed values for the approximation of sine of the fine angle B or other fine angle approximations.

The product device 416 is comprised of hardware and/or software configured for computing a plurality of products $P_1, \ldots, P_4$. The products $P_1, \ldots, P_4$ are computed using the pre-computed or pre-determined values for the most significant word of the cosine of the coarse angle A, the most significant word of the sine of the coarse angle A, the approximation of one minus the sine of the fine angle B, and the approximation of the sine of the fine angle B. The products $P_1, \ldots, P_4$ are described in detail above in relation to FIG. 1. The description provided above is sufficient for understanding the product $P_1, \ldots, P_4$ computations. It should be noted that the product device 416 can be comprised of a plurality of multipliers. Multipliers are well known to those having ordinary skill in the art, and therefore will not be described herein.

The product device 416 is also comprised of hardware and/or software configured for communicating the products $P_1, \ldots, P_4$ to the CSCD 418. The CSCD 418 is comprised of hardware and/or software configured for generating two (2) outputs. A first output represents the cosine of the angle $\emptyset'_{102}$. A second output represents the sine of the angle $\emptyset'_{102}$. The outputs can be generated by performing a plurality of computations using the cosine of the coarse angle A, the sine of the coarse angle A, the products $P_1, \ldots, P_4$, scale factors $SF_1, SF_2$ (described above in relation to FIG. 1), and octant mappings. The computations are described above in relation to FIGS. 1 and 3A-3B. The description provided above is sufficient for understanding the computations performed for generating the cosine of the input angle $\emptyset_{102}$ and the sine of the input angle $\emptyset_{102}$.

Figure 5:
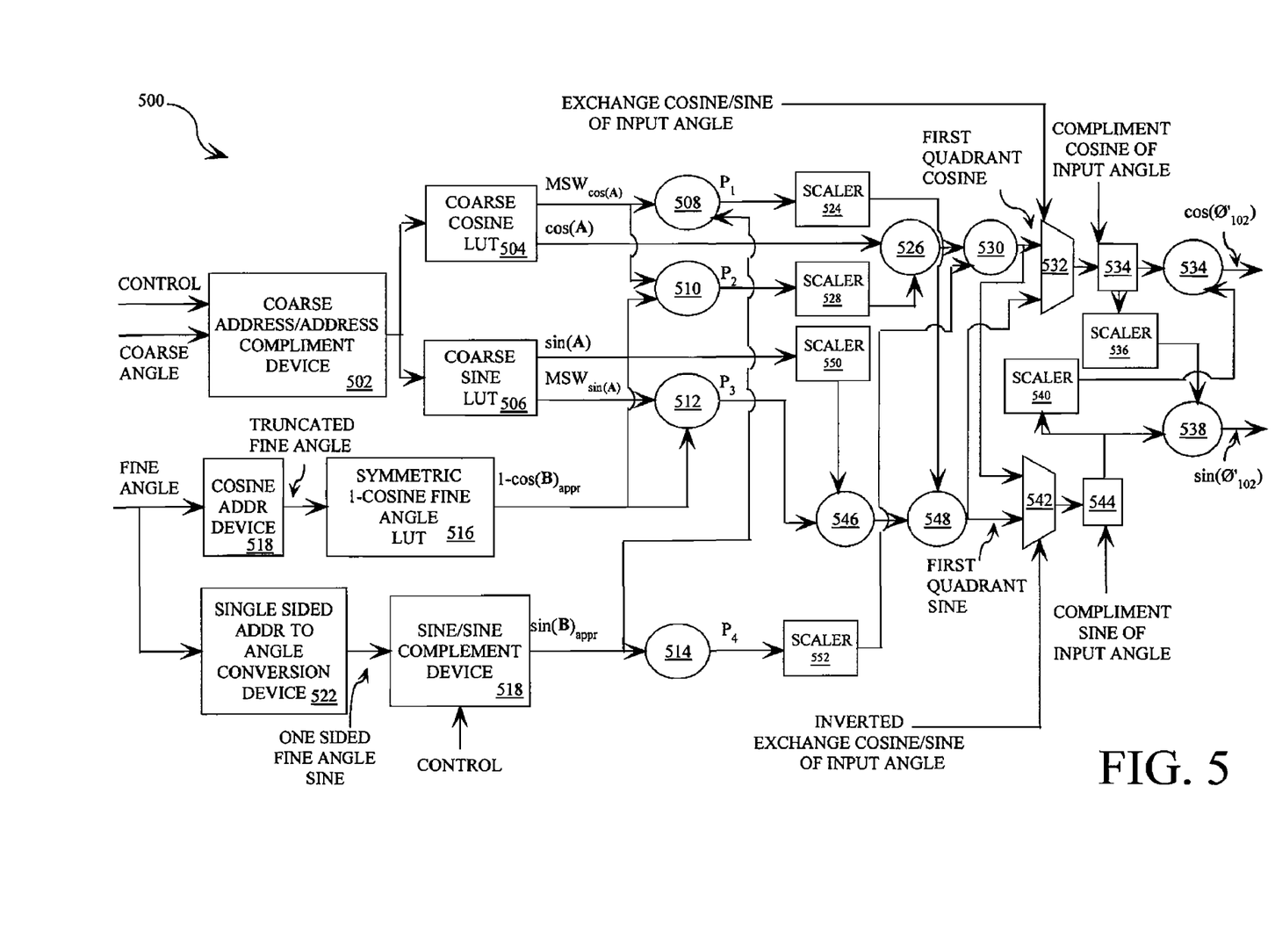
FIG. 5 is a block diagram of another exemplary sine/cosine generator that is useful for understanding the present invention.

Referring now to FIG. 5, there is provided another exemplary sine/cosine generator 500 that is useful for understanding the present invention. It should be noted that the sine/cosine generator 500 implements the method 300 described above in relation to FIGS. 3A and 3B minus the octant mapping of step 334. As shown in FIG. 5, the sine/cosine generator 500 is comprised of a coarse address/address compliment device 502, a coarse cosine look up table (LUT) 504, a coarse sine LUT 506, a cosine address device 518, a single sided address to angle conversion device 522, a symmetric 1–cos (B) LUT 516, a sine/sine complement device 518, and multipliers 508, 510, 512, 514.

It should be noted that the coarse cosine LUT 504 contains pre-computed values for the cosine of the coarse angle A and the most significant words for the cosine of the coarse angle A. By taking the calculated number of most significant bits (exclusive of the three most significant bits) at this point of the sin(input angle) and cos(input angle) computations, the size of the multiplications required to compute the sine and cosine of an input angle is reduced. It should also be noted that the number of bits for each most significant word is a function of the desired output accuracy of the sine/cosine generator 500. It should further be noted that each of the multipliers 508, 510, 512, 514 is provided for computing a respective product $P_1, \ldots, P_4$ (described above in relation to FIGS. 1 and 3A-3B).

Referring again to FIG. 5, the sine/cosine generator 500 is also comprised of scalers 524, 528, 550, 552, multipliers 526, 530, 546, 548, and multiplexers (MUXs) 532, 542. The sine/cosine generator 500 is further comprised of scalers 536, 540, compliment devices 534, 544, and adders 534, 538. It should be noted that the respective outputs of the compliment devices 534, 544 are the approximations of the cosine and sine of the first octant equivalent of the input angle. However, the approximations are not to the desired output accuracy. As a result, small compensation terms must be added by the scalers 536, 540 to supply the desired output accuracy. The compensation terms are a function of the input angle.

In light of the forgoing description of the invention, it should be recognized that the present invention can be realized in hardware, software, or a combination of hardware and software. A method for generating a sine and cosine of an input angle according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for generating a sine and cosine of an input angle, comprising the steps of:
   decomposing, by at least one electronic circuit, said input angle into an octant or quadrant, a coarse angle, and a fine angle;
   determining, by said electronic circuit, a cosine and a sine of said coarse angle;
   decomposing, by said electronic circuit, said cosine of said coarse angle to a first most significant word and a first least significant word and said sine of said coarse angle to a second most significant word and a second least significant word;
   computing, by said electronic circuit, an approximation of one minus a cosine of said fine angle and an approximation of a sine of said fine angle;
   computing, by said electronic circuit, a first product by multiplying said first most significant word by said approximation of a sine of said fine angle, a second product by multiplying said first most significant word by said approximation of one minus a cosine of said fine angle, a third product by multiplying said second most significant word by said approximation of one minus a cosine of said fine angle, and a fourth product by multiplying said second most significant word by said approximation of a sine of said fine angle; and
   generating, by said electronic circuit, approximations of a cosine of said input angle modulo $\pi/k$ and a sine of said input angle modulo $\pi/k$ using said cosine of said coarse angle, said sine of said coarse angle, and each of said products, wherein k is an integer selected in accordance with octant or quadrant symmetry.

2. The method according to claim 1, wherein said generating step further comprises
computing, by said electronic circuit, a first difference by subtracting said second product from said cosine of said coarse angle and a second difference by subtracting said third product from said sine of said coarse angle,
subtracting, by said electronic circuit, said fourth product from said first difference to yield said approximation of said cosine of said input angle modulo $\pi/k$, and
combining, by said electronic circuit, said first product and said second difference to yield said approximation of said sine of said input angle modulo $\pi/k$.

3. The method according to claim 1, further comprising:
scaling, by said electronic circuit, said approximation of said sine of said input angle by a first scale factor; and
combining, by said electronic circuit, said scaled approximation of said sine of said input angle with said approximation of said cosine of said input angle to yield said cosine of said input angle.

4. The method according to claim 3, further comprising:
scaling, by said electronic circuit, said approximation of said cosine of said input angle by a second scale factor; and
combining, by said electronic circuit, said scaled approximation of said cosine of said input angle with said approximation of said sine of said input angle to yield said sine of said input angle.

5. The method according to claim 4, wherein said first and second scale factors are a function of a weighting of said first and second most significant words.

6. The method according to claim 4, further comprising:
mapping, by said electronic circuit, said sine of said input angle modulo $\pi/k$ to a sine of said input angle using N most significant bits from said input angle; and
mapping, by said electronic circuit, said cosine of said input angle modulo $\pi/k$ to a cosine of said input angle using said N most significant bits, wherein N is an integer.

7. The method according to claim 1, wherein said cosine and sine of said coarse angle are pre-computed values selected from at least one look up table.

8. The method according to claim 1, wherein said approximations of one minus a cosine of said fine angle and said sine of said fine angle are computed using Taylor Series Approximations.

9. The method according to claim 8, wherein each of said approximations of one minus a cosine of said fine angle and said sine of said fine angle is computed using a Taylor Series of an $N^{th}$ order selected for providing an n bit precision.

10. The method according to claim 1, wherein said first and second most and least significant words are pre-computed values selected from at least one look up table.

11. The method according to claim 10, wherein said first and second least significant words are scaled such that bits stored in said at least one look up table are significant.

12. The method according to claim 1, wherein said coarse angle is in a quadrant or octant of a two dimensional space.

13. The method according claim 12, wherein said coarse angle is one of a plurality of angles in said quadrant or octant of a two dimensional space.

14. The method according to claim 1, wherein said fine angle is bounded by a smallest coarse angle existing in a two dimensional space.

15. A sine/cosine generator, comprising:
a decomposition device configured for decomposing said input angle into an octant or quadrant, a coarse angle, and a fine angle;
at least one coarse angle device configured for determining a cosine of said coarse angle, determining a sine of said coarse angle, decomposing said cosine of said coarse angle to a first most significant word and a first least significant word, and decomposing said sine of said coarse angle to a second most significant word and a second least significant word;
at least one fine angle device configured for computing an approximation of one minus a cosine of said fine angle and an approximation of a sine of said fine angle;
a product computation device configured for computing a first product by multiplying said first most significant word by said approximation of a sine of said fine angle, a second product by multiplying said first most significant word by said approximation of one minus a cosine of said fine angle, a third product by multiplying said second most significant word by said approximation of one minus a cosine of said fine angle, and a fourth product by multiplying said second most significant word by said approximation of a sine of said fine angle; and
an output computation device coupled to said product computation device and said at least one coarse angle device, said output computation device configured for generating approximations of a cosine of said input angle modulo $\pi/k$ and a sine of said input angle modulo $\pi/k$ using said cosine of said coarse angle, said sine of said coarse angle, and each of said products, wherein k is an integer selected in accordance with octant or quadrant symmetry.

16. The sine/cosine generator according to claim 15, wherein said output computation device is further configured for
computing a first difference by subtracting said second product from said cosine of said coarse angle and a second difference by subtracting said third product from said sine of said coarse angle,
subtracting said fourth product from said first difference to yield said approximation of said cosine of said input angle modulo $\pi/k$, and
combining said first product and said second difference to yield said approximation of said sine of said input angle modulo $\pi/k$.

17. The sine/cosine generator according to claim 15, wherein said output computation device is further configured for scaling said approximation of said sine of said input angle by a first scale factor, and combining said scaled approximation of said sine of said input angle with said approximation of said cosine of said input angle to yield said cosine of said input angle.

18. The sine/cosine generator according to claim 17, wherein said output computation device is further configured for scaling said approximation of said cosine of said input angle by a second scale factor, and combining said scaled approximation of said cosine of said input angle with said approximation of said sine of said input angle to yield said sine of said input angle.

19. The sine/cosine generator according to claim 18, wherein said first and second scale factors are a function of a weighting of said first and second most significant words.

20. The sine/cosine generator according to claim 18, wherein said output computation device is further configured for mapping said sine of said input angle modulo $\pi/k$ to a sine of said input angle using N most significant bits from said input angle and for mapping said cosine of said input angle modulo π/k to a cosine of said input angle using said N most significant bits, wherein N is an integer.

21. The sine/cosine generator according to claim 15, wherein said at least one coarse angle device is comprised of at least one look up table and said cosine and sine of said coarse angle are pre-computed values selected from said at least one look up table.

22. The sine/cosine generator according to claim 15, wherein said at least one fine angle device is further configured for computing said approximations of one minus a cosine of said fine angle and said sine of said fine angle using Taylor Series Approximations.

23. The sine/cosine generator according to claim 22, wherein said at least one fine angle device is further configured for computing said each of said approximations of one minus a cosine of said fine angle and said sine of said fine angle using a Taylor Series of an $N^{th}$ order selected for providing an n bit precision.

24. The sine/cosine generator according to claim 15, wherein said at least one coarse angle device is comprised of at least one look up table and said first and second most and least significant words are pre-computed values selected from said at least one look up table.

25. The sine/cosine generator according to claim 15, wherein said coarse angle is in a octant or quadrant of a two dimensional space and said fine angle is bounded by a smallest coarse angle existing in a two dimensional space.

* * * * *